US006321967B1

(12) United States Patent
Michalik et al.

(10) Patent No.: US 6,321,967 B1
(45) Date of Patent: Nov. 27, 2001

(54) DEVICE FOR DRAWING IN A WEB OF ENDLESS FABRIC

(75) Inventors: Horst Bernhard Michalik, Höchberg; Manfred Wolfgang Hartmann, Elfershausen, both of (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/581,238

(22) PCT Filed: Dec. 18, 1998

(86) PCT No.: PCT/DE98/03725

§ 371 Date: Jun. 26, 2000

§ 102(e) Date: Jun. 26, 2000

(87) PCT Pub. No.: WO99/33662

PCT Pub. Date: Jul. 8, 1999

(30) Foreign Application Priority Data

Dec. 24, 1997 (DE) ............................................. 197 57 978

(51) Int. Cl.[7] .............................. G03B 1/56; B65H 20/00

(52) U.S. Cl. ............................................ 226/91; 226/188

(58) Field of Search ................................ 226/91, 92, 188

(56) References Cited

U.S. PATENT DOCUMENTS 2,862,705 * 12/1958 Faeber .................................... 226/92
2,944,345 * 7/1960 Faeber ................................ 226/92 X
3,624,875 * 12/1971 Haft .................................... 226/92 X
4,063,505 12/1977 Sasamoto et al. .
4,154,386 5/1979 Kawada .
4,480,801 * 11/1984 Stone ................................ 226/92 X
4,648,942 * 3/1987 Wanke et al. ...................... 226/92 X
4,750,659 * 6/1988 Maier et al. .......................... 226/92
4,901,740 2/1990 Heitmann .
5,052,295 * 10/1991 Suzuki et al. ...................... 226/92 X
5,400,940 * 3/1995 Sato et al. ............................. 226/92
5,996,873 * 12/1999 Pimpis .................................. 226/92

FOREIGN PATENT DOCUMENTS 24 02 768 4/1978 (DE) .
33 44 929 7/1984 (DE) .
36 04 504 1/1989 (DE) .
195 05 432 9/1995 (DE) .
0 094 631 9/1986 (EP) .

* cited by examiner

*Primary Examiner*—Michael R. Mansen
(74) *Attorney, Agent, or Firm*—Jones, Tullar & Cooper, PC

(57) ABSTRACT

An endless web of material, such as a web of paper, is drawn into a device by using moving traction devices along the path of web travel. Web guide rollers that support the web in the device are accelerated before the arrival of the leading end or the beginning of the material web.

5 Claims, 2 Drawing Sheets

DEVICE FOR DRAWING IN A WEB OF ENDLESS FABRIC

FIELD OF THE INVENTION

The present invention is directed to a device for drawing-in a web of material. The material is drawn in along a web travel path that has guide rollers.

DESCRIPTION OF THE PRIOR ART

A device for drawing-in a web of material by finite flexible traction means driven along the draw-in path by means of adjoining drive stations is known from DE 24 02 768 C2.

It is a limitation of this prior device that the drawing means are subjected to great wear, since they must conduct the web of material, for example a paper web, around a number of paper guide rollers, wherein some of the paper guide rollers reverse them by up to 180° and they must be brought from a stop to the draw-in speed by the paper web. It is therefore possible, in the course of the draw-in of the paper web, that large tensional forces act on the draw-in tip formed on the paper web, which forces often lead to a break in the paper web at a location between the paper web and the adhesive tip.

DE 36 04 504 C2 describes a draw-in device, in which the guide rollers are driven by means of an auxiliary drive mechanism during the draw-in of a paper web.

EP 0 094 631 B1 shows a device for drawing-in a web of material by means of a rope. This rope drives guide rollers via a controllable coupling.

SUMMARY OF THE INVENTION

The object of the present invention is directed to providing a device for drawing-in a web of material.

In accordance with the present invention, this object is attained by providing a material web path that has guide rollers. At least one of these guide rollers is rotated by a drive mechanism prior to the arrival of the web of material. An overriding coupling is provided between the roller drive mechanism and the guide roller or rollers.

The advantages which can be achieved by means of the present invention reside, in particular, in that it is possible to greatly reduce the strain on the web of material, and on the traction means when drawing the web of material into the printing press. The reduced strain on the web of material and on the traction means permits an increase of the draw-in speed of the web of material almost up to the production speed.

No particular control devices are necessary for switching the drive mechanism when the web of material takes over the driving of the guide roller. Strains on the web of material caused by jerking of the material are reduced.

BRIEF DESCRIPTION OF THE DRAWING

A preferred embodiment of the present invention is represented in the drawings and will be described in greater detail in what follows. Each of FIGS. 1 and 2 of the drawings represents a schematic perspective view of a drive area of guide rollers for webs of material along a draw-in path of a paper web in accordance with the present invention.

DESCRIPTION OF THE PREFERRED EMBODIMENT

Figure 1:
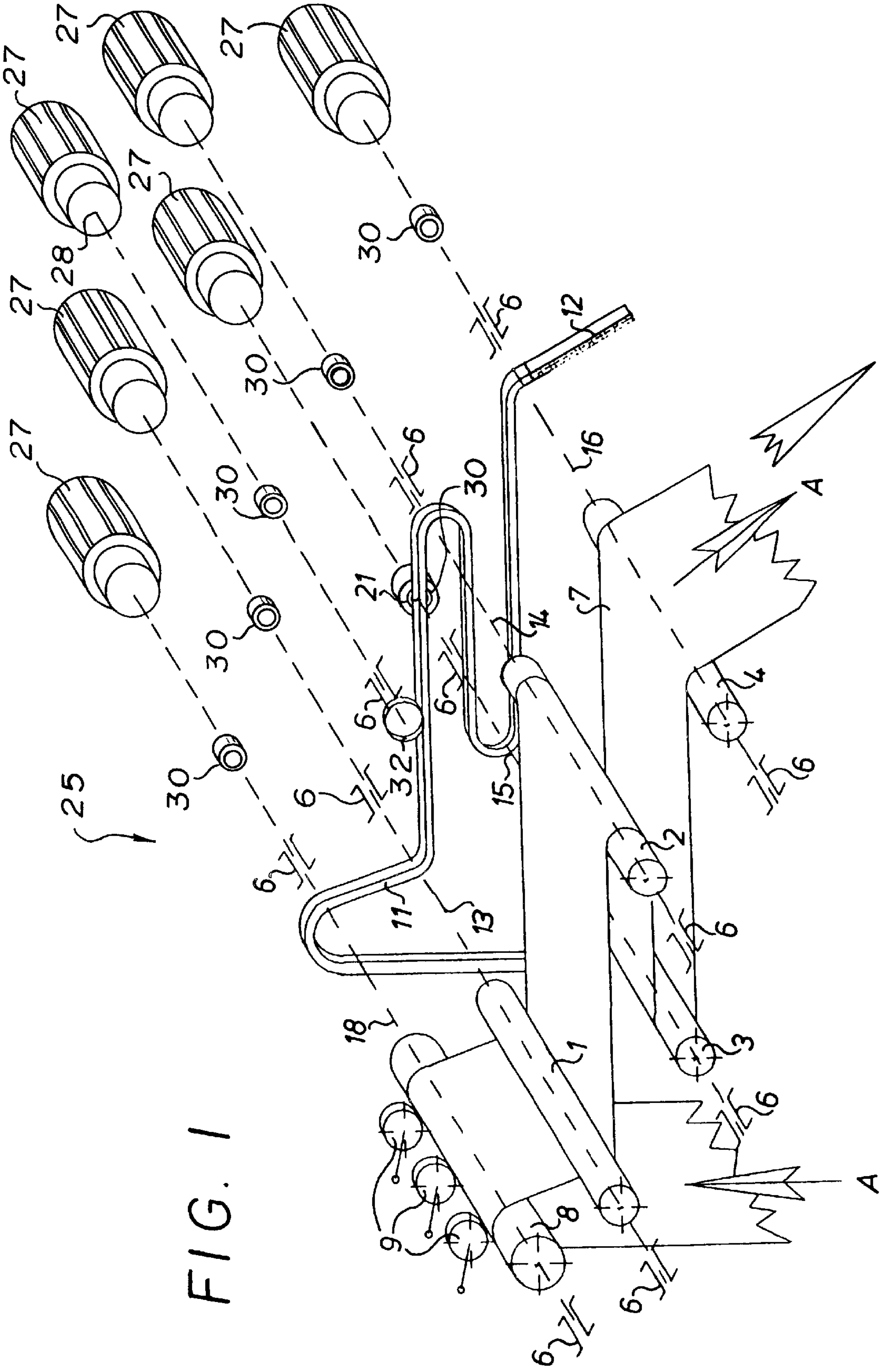

A number of guide rollers, for example paper guide rollers 1, 2, 3, 4, are seated by support of their shaft journals 13, 14,

15, 16 in respective bearings 6 in right and left lateral frames, not specifically represented, of a web-fed rotary printing press. A traction cylinder 8 with cooperating traction rollers 9, which is also seated, by its shaft journal 18 and bearings 6, fixed in place in the lateral frames, is positioned upstream of the paper guide rollers 1 to 4 in the running direction A of a web of material, for example a paper web 7. A guide rail 11, which is generally known per se, is fastened on the inside of one of the two lateral frames and receives a finite traction means 12, for example a roller chain. The guide rail 11 consists, for example, of a C-shaped profiled section, which receives the traction means 12, only a part of which is shown. The traction means 12 is partially guided around the paper guide rollers 1 to 4, as well as around the traction cylinder 8, or around their respective bearings. The guide rail 11 runs along the side of the path of the web of material such as the paper web 7.

In a first roller drive embodiment as seen in FIG. 1, a separate drive motor 27 is assigned as the drive mechanism to each one of the rollers 1 to 4, 8.

Figure 2:
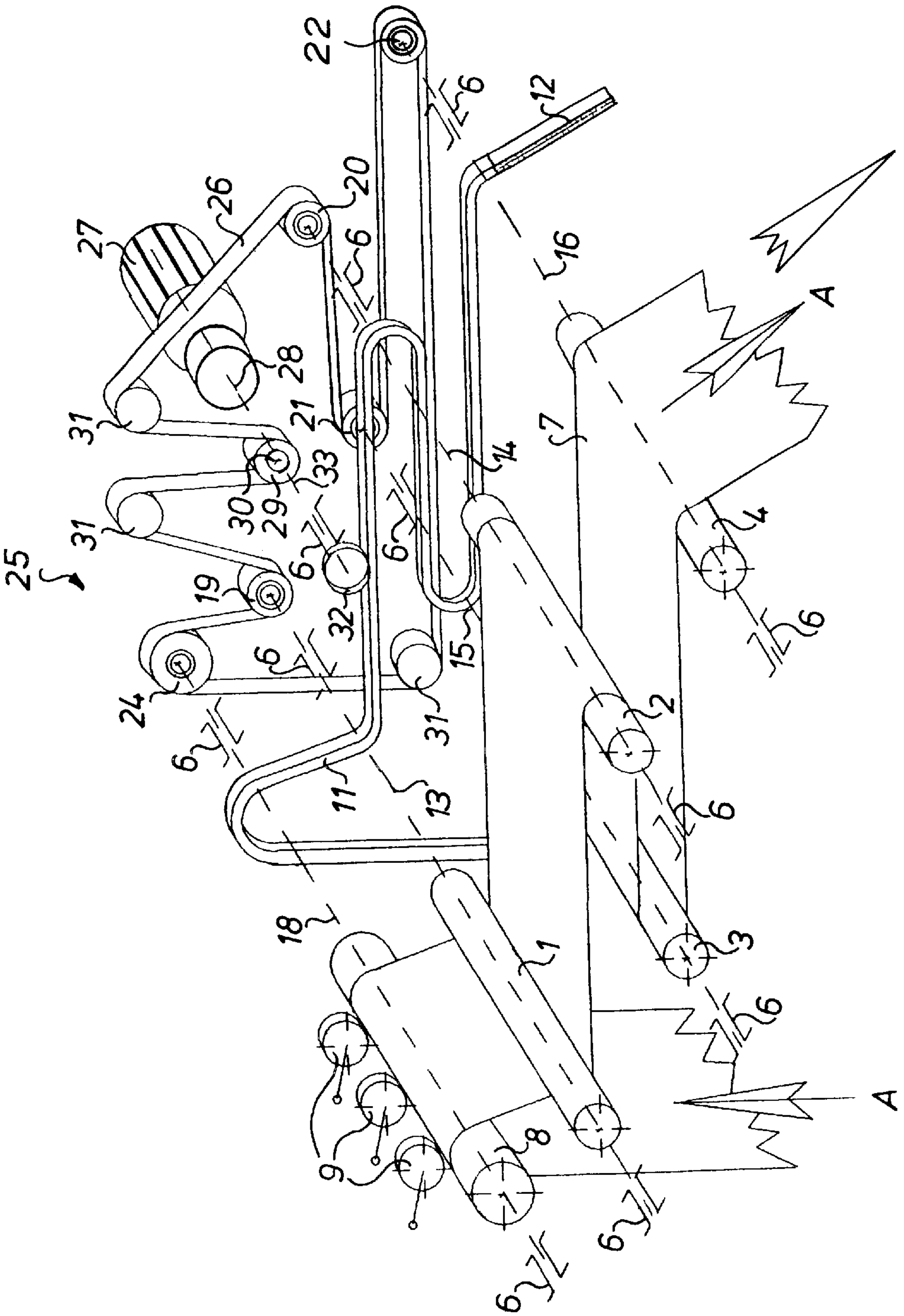

In a second roller drive embodiment, as represented in FIG. 2, the drive mechanism, such as a drive motor 27, is connected indirectly with one of the respective shaft journals 13, 14, 15, 16 of a selected paper guide roller 1 to 4 seated in the lateral frames, and/or of a traction cylinder 8, via shaft journal 18. The drive motor 27 has a driveshaft 28 which is frictionally connected, through the interposition of an electrically controllable coupling 30, with one of a plurality of toothed belt pulleys 19 to 22, 24, 29. In the depicted configuration, motor 27 is connected with the toothed belt pulley 29. A number of belt deflection pulleys 31, fixed in place in the lateral frame, are also provided. An endless traction means, for example a toothed belt 26, synchronously drives several paper guide rollers 1 to 4 or traction cylinder 8 via their belt pulleys 19 to 22, 24. At least one of the toothed belt pulleys 19 to 22, 24, 29 is driven by the drive motor 27, which may be an rpm-controlled drive motor such as an electric or hydraulic or pneumatic motor.

It is advantageous that the drive motor 27 simultaneously takes over the drive for the finite traction means 12, such as the roller chain. For this purpose, the power take-off of the coupling 30 is connected with a driveshaft 33, seated fixed in place in the lateral frame, of a drive chain wheel 32 for the traction means 12, such as the roller chain. The drive chain wheel 32 meshes with the chain links of the traction means 12, which is conducted in the guide rail 11. The coupling 30 is suitably embodied as a so-called overriding coupling.

The driving force of the finite traction means 12, for example of the roller chain 12, could also be derived from another drive mechanism, not specifically represented, of the traction cylinder 8.

All of the driven belt pulleys embodied, for example, as toothed belt pulleys 19–22, 24 and 29, have an overriding free-wheeling device or an electrically controllable coupling which, at a preselected speed or number of revolutions per time unit, will interrupt the force flow from, for example the belt pulley to the respective paper guide roller. Because of this, the paper guide rollers 1 to 4 are then driven only by the moving web of material 7.

Other paper guide rollers are also combined into respective mutually driven drive mechanism groups 25 along the draw-in path.

It is also possible to provide a guide roller with a drive mechanism, such as, for example a gear wheel, which works together with the finite traction means 12, which may be a roller chain having a finite length of approximately 6 m only some of the time. An overriding coupling may be arranged between the gear wheel and the guide roller. The guide roller is driven by the traction means at least some of the time.

The path length of the draw-in path between two adjoining drive mechanisms, such as drive chain wheel 32, is shorter than the length of the finite length traction means 12.

The draw-in process when drawing a paper web 7 takes place as follows: initially all of the various drive motors 27 located along the selected paper web path, or the draw-in path for the paper web 7, are started in order to be able to move the roller chain 12. The paper guide rollers 1 to 4 can have, for example, a lesser, the same, or a greater circumferential speed than the paper web draw-in speed.

Each drive mechanism area, or group 25 only has a small number of paper guide rollers 1 to 4, or respectively 8. The paper guide rollers 1 to 4 contained in the drive mechanism area or group 25 represented are connected with the drive belt, for example the toothed belt 26, and are thus connected with the drive motor 27 for the roller chain 12 by means of the coupling 30 located in the toothed belt pulley 29. Since the drive motor 27 in each drive mechanism group 25 is started prior to the arrival of the finite length roller chain 12, it can accelerate the paper guide rollers 1 to 4 to the paper draw-in speed by coupling them in. When the roller chain 12 reaches the drive mechanism area or group 25, the paper guide rollers 1 to 4, which are connected by the toothed belt 26, are uncoupled from the drive mechanism or motor 27 by means of the coupling 30, and the paper web 7 takes over the driving output of the paper guide rollers 1 to 4. If the belt pulleys provided with a drive mechanism have a free-wheeling device, the latter now becomes operative.

In accordance with a first preferred embodiment, the diameter of the belt pulleys 19 to 22 is of such a dimension, that the paper guide rollers 1 to 4 are driven at a circumferential speed which approximately corresponds to 95% of the paper web draw-in speed. When the paper web 7 itself reaches the drive mechanism area 25, the free-wheeling device, or respectively the override coupling 30, becomes effective and the paper guide rollers 1 to 4 are accelerated by the amount of the remaining five percent to the paper web draw-in speed.

In connection with other embodiments, the paper guide rollers 1 to 4 can be driven at the full paper web draw-in speed, or at a higher speed, for example at 108% of the paper web drawing-in speed, in particular in case of an individual drive mechanism and without a free-wheeling device.

In accordance with another embodiment, it is of course also possible to employ a belt draw-in system in place of a guide rail 11 and a roller chain 12.

The drive motors 27 are switched off at the end of the draw-in process.

While a preferred embodiment of a device for drawing in a web of endless fabric in accordance with the present invention has been set forth fully and completely hereinabove, it will be apparent to one of skill in the art that a number of changes in, for example, the overall sizes of the guide rollers, the specific type of endless web being drawn in, and the like could be made without departing from the true spirit and scope of the present invention which is accordingly to be limited only by the following claims.

What is claimed is:

1. A device for drawing-in a web of material along a path of material web travel comprising:

a plurality of material web guide rollers located along the path of material web travel;

a drive mechanism for rotating at least one of said material web guide rollers prior to the arrival of a start of the material web at said plurality of material web guide rollers; and an overriding coupling arranged between said material web guide roller drive mechanism and said plurality of material web guide rollers, said overriding coupling disengaging said material web guide roller drive mechanism from said at least one material web guide roller after the arrival of the material web at said at least one material web guide roller.

2. The device of claim 1 wherein each of said plurality of material web guide rollers is provided with a separate drive motor, said plurality of separate drive motors forming said drive mechanism.

3. The device of claim 1 wherein said drive mechanism is a common drive mechanism for several of said plurality of material web guide rollers.

4. The device of claim 1 further including a material web drawing-in traction means, said traction means being driven by said drive mechanism.

5. The device of claim 1 further including a material web traction cylinder having a traction cylinder drive, said traction cylinder drive being driven by said drive mechanism.

* * * * *